United States Patent [19]

Fujimoto

[11] Patent Number: 4,689,751
[45] Date of Patent: Aug. 25, 1987

[54] NUMERICAL CONTROL DEVICE
[75] Inventor: Akihiko Fujimoto, Aichi, Japan
[73] Assignee: Mitsubishi Denki Kabushiki Kaisha, Tokyo, Japan
[21] Appl. No.: 760,859
[22] Filed: Jul. 31, 1985
[30] Foreign Application Priority Data
  Jul. 31, 1984 [JP] Japan ................................ 59-158800
[51] Int. Cl.⁴ ..................... G06F 15/46; G06F 1/00; G05B 19/18
[52] U.S. Cl. ................................. 364/474; 364/167; 364/200
[58] Field of Search ... 364/200 MS File, 900 MS File, 364/474, 153, 154, 167, 200, 290, 291, 384, 394, 398

[56]  References Cited
U.S. PATENT DOCUMENTS 4,068,297  1/1978  Komiya ............................... 364/167
4,245,306  1/1981  Besemer et al. ..................... 364/200
4,281,379  7/1981  Austin ................................ 364/474
4,356,552 10/1982  Imazeki et al. ..................... 364/474
4,396,976  8/1983  Hyatt .................................. 364/167

Primary Examiner—Jerry Smith
Assistant Examiner—Allen R. MacDonald
Attorney, Agent, or Firm—Sughrue, Mion, Zinn, Macpeak and Seas

[57] ABSTRACT

A numerical control system in which an external computer such as a microcomputer is used for controlling and communicating with a numerical control device. A first memory is provided for storing data control character codes for the external computer, while a second memory is provided for accessing the contents of the first memory for translating communications data used in data communications between the computer and the numerical control device. The contents of the first memory are determined so as to allow the numerical control device to perform data communications with an external computer employing different data control character codes.

3 Claims, 7 Drawing Figures

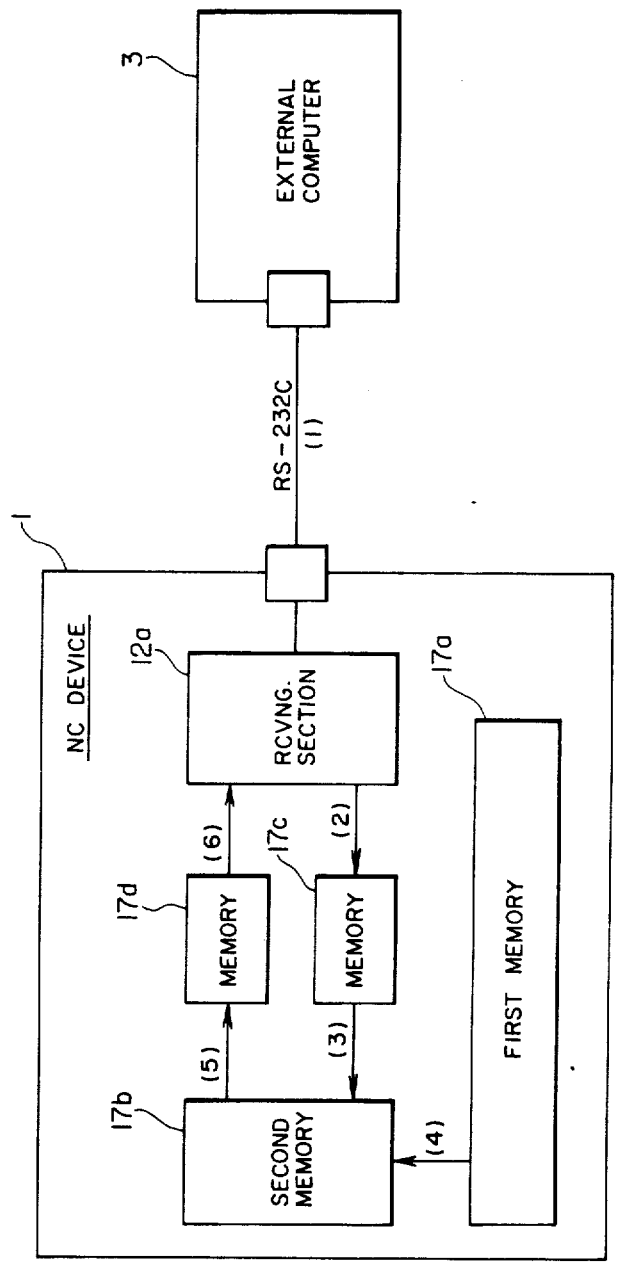

FIG. 6

| DATA CONTROL CHARACTER (FUNCTION) | NC CODE | COMPUTER CODE |
|---|---|---|
| ↑ | 1B41 | 1E |
| ↓ | 1B42 | 1F |
| → | 1B43 | 1C |
| ← | 1B44 | 1D |

FIG. 7

| CODE | NAME | DEFINITION |
|---|---|---|
| SOH | START OF TEXT | START OF HEADING FOR INFORMATION MESSAGE |
| STX | START OF TEXT | TERMINATION OF HEADING PRIOR TO TEXT |
| ETX | END OF TEXT | REPRESENTS THE END OF A SEGMENT OF TEXT |
| EOT | END OF TRANSMISSION | REPRESENTS THE TERMINATION(S) OF AT LEAST ONE DATA TRANSMISSION OPERATION |

NUMERICAL CONTROL DEVICE

BACKGROUND OF THE INVENTION

The subject matter of this application is related to that of co-pending application Ser. No. 618,163, filed on June 7, 1984.

The present invention relates to a numerical control device which can perform data communications with a variety of external computers.

A conventional numerical control device of this type is shown in FIG. 1. In FIG. 1, reference numeral 1 designates the numerical control device; 2, a paper tape on which numerical data has been recorded to cause the numerical control device 1 to issue instruction signals to a numerically controlled machine tool 4; and 3, an external computer for controlling the machine tool 4.

In this conventional device, numerical data is read from the tape 2 and applied through an input section 11 to a central processing unit (CPU) 12. The central processing unit 12 operates to cause an arithmetic section 13 to calculate control values for the machine tool 4, and thus the machine tool 4 is automatically controlled through an output section 15 according to conditions such as correction values for the machine tool set by a display section 14.

In order to perform such numerical control according to data from the external computer 3, a data transmitting and receiving section is provided in the central processing unit 12 to allow data communications between the central processing unit 12 and the external computer 3. In this conventional system, since the data communications method is determined in advance, it is necessary to employ the external computer 3, which is used only for the numerical control device 1, and to use exclusive data control character codes to perform data communications. In this connection, the data obtained by the control section 12 from the external computer 3 through the data transmitting and receiving section 12a is returned to the control section 12 after being converted into words by a transmitting and receiving data translating section 16a in a memory section 16 in the numerical control device 1.

In the conventional numerical control device constructed as described above, the external computer employable for data communications is limited: whenever a computer other than an exclusive computer is used as the external computer, a large number of data control character codes must be provided in the transmitting and receiving data transforming section. Thus, the conventional numerical control device is disadvantageous in that it is difficult for the device to use a microcomputer as its external computer.

SUMMARY OF THE INVENTION

An object of this invention is to eliminate the above-described difficulty accompanying a conventional numerical control device.

In accordance with the above and other objects, the invention provides a numerical control device in which a memory for storing data control character codes is provided in the memory section. With this arrangement, a computer other than its own computer can be externally connected to the numerical control device for data interchange.

BRIEF DESCRIPTION OF THE DRAWINGS

FIG. 3 is an explanatory diagram for a description of essential components in FIG. 2;

FIG. 6 is a table showing correspondence of data code values stored in a translation memory; and FIG. 7 is a table showing examples of transmission control characters.

DESCRIPTION OF THE PREFERRED EMBODIMENTS

Figure 1:
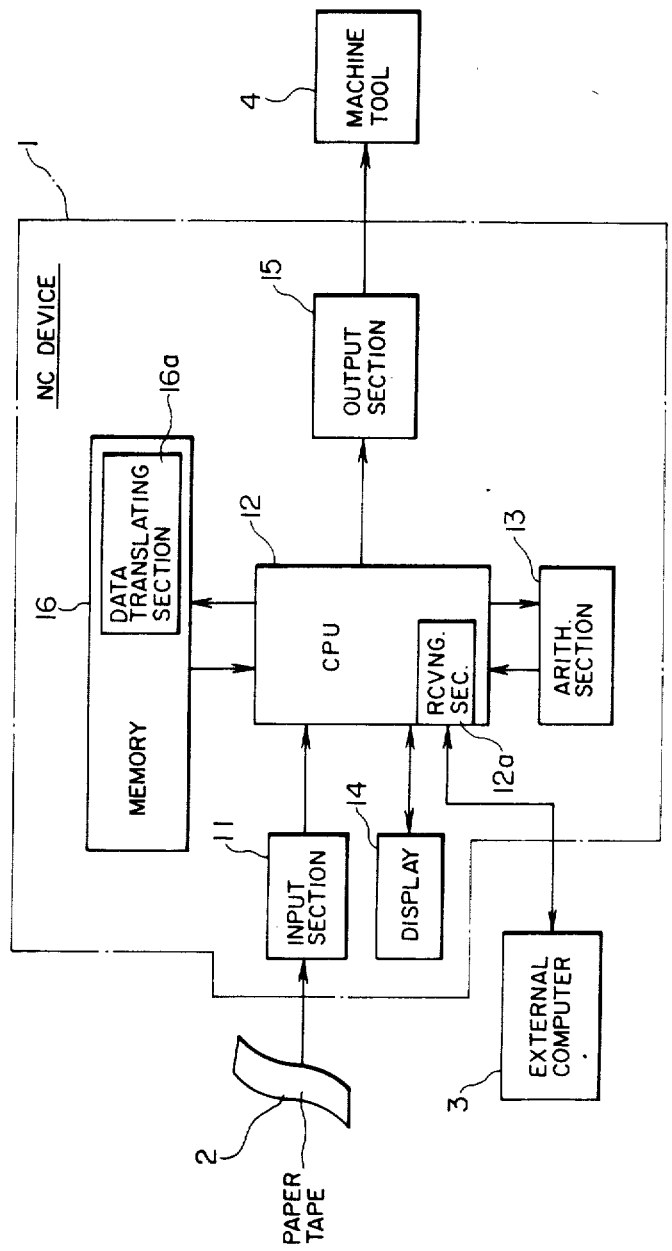
FIG. 1 is a block diagram showing the arrangement of a conventional numerical control device.
Figure 2:
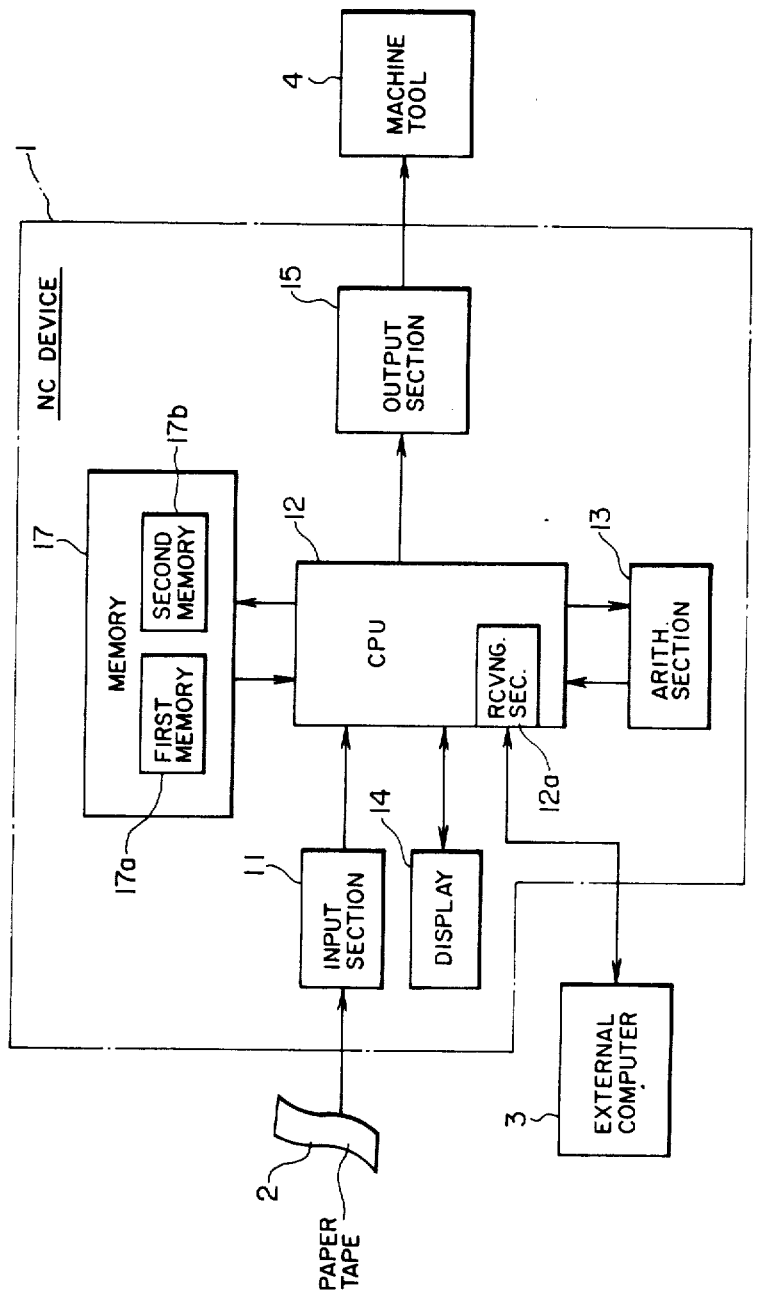
FIG. 2 is a block diagram showing an example of a numerical control device according to this invention.

A preferred embodiment of this invention will be described with reference to FIGS. 2 and 3. FIG. 2 is a block diagram showing the arrangement of a numerical control device according to the invention, and FIG. 3 is an explanatory diagram for a description of essential components shown in FIG. 2. In FIGS. 2 and 3, those components which have been previously described with reference to FIG. 1 are designated by the same reference numerals or characters. In FIG. 2, reference numeral 17 designates a memory section, which is an essential component of the numerical control device according to the invention; 17a, a first memory used for storing data control character codes; and 17b, a second memory used for interpreting the data transmitted to and received from the external computers.

The operations of the numerical control device will be described.

In FIG. 2, the operation of reading input data from the paper tape 2 to automatically control the machine tool is the same as that which has been described with reference to the conventional numerical control device. In the case where a general-purpose microcomputer is employed as the external computer, data control character codes used for the microcomputer are transmitted between the microcomputer, namely, the external computer 3, and the data transmitting and receiving section 12a, which is provided in the control section 12 of the central processing unit (CPU) in the numerical control device. In order to read a code inputted from the external computer, under the control of the control section 12, the first memory, in which the data control character codes of the external computer have been stored, is accessed according to the contents of the second memory 17b, which forms a transmitting and receiving data translating section.

The control section performs control as required according to the data obtained through the above-described code translating operation. In the case where data is transmitted to the external computer 3, the second memory 17b translates it into a code for the external computer 3 by accessing the codes in the first memory 17a, and the control section 12 causes the data transmitting and receiving section 12a to transmit the code to the external computer 3.

As is apparent from the above description, in the numerical control device of the invention, data transmission is carried out by use of the data control character codes of the external computer 3.

The operations of essential components performing this data transmission will now be described with reference to FIG. 3.

In the case where, in FIG. 3, a general-purpose microcomputer is employed as the external computer, an ordinary RS-232C interface is used to connect the computer to the numerical control device, and ASCII codes are used for data transmission. However, it should be noted that different types of microcomputers employ different sets of data control character codes, such as screen control codes and cursor control codes. The numerical control device 1 cannot perform data transmission at all if the employed set of data control character codes is different. In order to overcome this difficulty, that is, in order to detect the code difference, the numerical control device 1 is provided with the first memory 17a, as shown in FIG. 3, which is a data control character code storing section used to store the data control character codes of the external computer 3. Thus, the codes or language for the external computer 3 are made to agree with the numerical control device. After this language reconciliation, it becomes possible to perform data communications between the general-purpose personal microcomputer and the numerical control device.

In the numerical control device capable of performing data communications, when data is received through the data transmitting and receiving section 12a from the external computer 3 (FIG. 2), the data thus received is arranged and temporarily stored in a data receiving buffer 17c in the memory section 17. Under the control of the control section 12, the data thus stored is transmitted to the second memory 17b. In the second memory 17b, the data thus received is translated into codes for the numerical control device 1 while accessing the data control character codes in the first memory 17a. This operation is also carried out at the time of data transmission. The data to be transmitted is translated into data control character codes for the external computer 3 in the second memory 17b. Thereafter, the translated data is arranged as transmitting data and temporarily stored in the data transmitting buffer 17d. The data thus stored is transmitted to the external computer 3 through the data transmitting and receiving section 12a under the control of the control section 12.

As is apparent from the above description, in the numerical control device of the invention, the data control character codes of the external computer are stored in the first memory 17a. Therefore, the numerical control device can be connected to a general-purpose microcomputer such as one using ASCII codes. Therefore, if a rewritable memory element such as a RAM is employed as the first memory 17a, the numerical control device can access an external computer 3 which uses a different set of data control character codes. Furthermore, if plural ROMs are provided for the first memory 17a, different ROMs can be provided for different external computers. In addition, if protocol data is inputted to the first memory 17a, different computers can be externally connected to the numerical control device of the invention.

Figure 4:
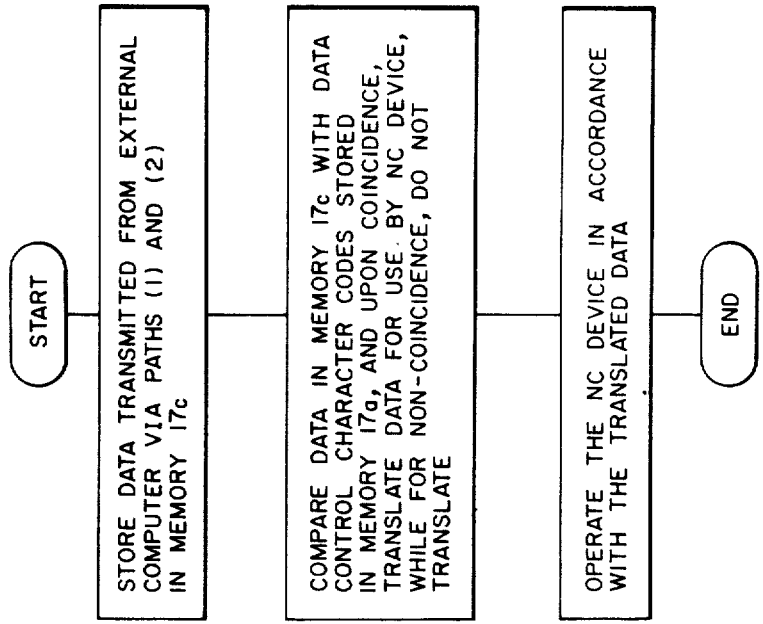
FIG. 4 is a flowchart describing the transmission of data from an external computer to an NC device.

FIG. 4 is a flowchart describing the transmission of data from an external computer to the NC device. First, data transmitted from the external computer 3 is communicated along paths (1) and (2) indicated in FIG. 3 to the memory 17c. The data held in the memory 17c is then compared with the data control character codes stored in the memory 17a. For each code, when a match is found between that code and an entry in the memory 17a, the translated code (the memory 17a storing pairs of input and output code values) is transmitted along the path 4 to the memory 17b. Thus, translation of the data codes has been effected. If coincidence is not found, however, no translation is carried out. The numerical control device is then operated in accordance with the translated data.

Figure 5:
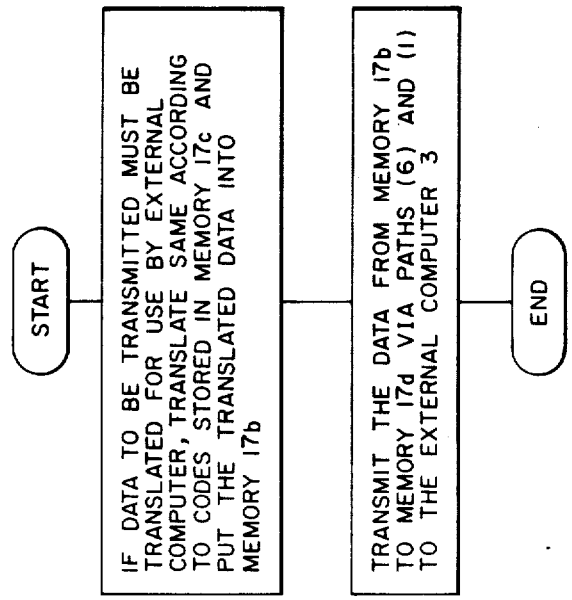
FIG. 5 is a flowchart describing transmission of data from the NC device to the external computer.

FIG. 5 is a flowchart describing the transmission of data from the NC device 2 to the external computer. First, if the data to be transmitted has to be translated to make it agree with that of the external computer, the necessary translation operation is carried out in accordance with the codes stored in the memory 17a. The translated data codes are then transferred to the memory 17b along the path (4). This data is then transferred from the memory 17b along the path (5) to the memory 17d for storage therein. When the data is needed, it is read from the memory 17d along the path (6) and then applied to the external computer 3 along the path (1).

FIG. 6 is a table showing examples of code pairs stored in the memory 17a. For instance, the second entry from the top of the table relates to moving the cursor downwardly. The corresponding code used in the NC is 1B42, while the computer code is 1F (hexadecimal).

FIG. 7 is a table showing examples of transmission control characters, particularly, protocol data, which is data required for data transmission processing where computers employing different codes for transmission control characters are connected in the same system. This data is stored in the memory 17a in advance in the inventive system.

As is apparent from the above description, the numerical control device of the invention includes a memory (the first memory) used to store the data control character codes of an external computer connected thereto, and a translating section which reads communications data by accessing the contents of the memory. Therefore, a general-purpose personal computer using a different set of data control character codes can be connected, as the external computer, to the numerical control device for the purpose of data communications without greatly modifying the numerical control device, namely, merely by rewriting the contents of the memory section.

I claim:

1. A numerical control device having a data transmitting function for performing data communications with an external computer, comprising:
   a first memory for storing data control character codes for said external computer;
   a second memory and processor means for accessing contents of said first memory for translating communications data used in said data communications; and
   interface transmission means for coupling said second memory to said external computer,
   contents of said first memory being determined so as to allow said numerical control device to perform data communications with another external computer employing different data control character codes, said first memory storing data code pairs wherein, in each of said pairs, one data code value corresponds to a code employed by said external computer and the other value corresponds to a code employed by said numerical control device for effecting a like function as said code value of said external computer.

2. The numerical control device of claim 1, wherein said external computer comprises a microcomputer.

3. The numerical control device of claim 1, wherein said transmission interface means employs RS-232C standards and ASCII codes for data transmission.

* * * * *